(No Model.) 2 Sheets—Sheet 1.

N. TESLA.
ELECTRO MAGNETIC MOTOR.

No. 424,036. Patented Mar. 25, 1890.

Witnesses:
Raphael Netter
Frank E. Hartley

Inventor
Nikola Tesla
By
Duncan, Curtis & Page
Attorneys.

(No Model.) 2 Sheets—Sheet 2.

N. TESLA.
ELECTRO MAGNETIC MOTOR.

No. 424,036. Patented Mar. 25, 1890.

Witnesses:
Raphael Netter
Frank E. Hartley

Inventor
Nikola Tesla
By
Duncan, Curtis & Page
Attorneys.

United States Patent Office.

NIKOLA TESLA, OF NEW YORK, N. Y., ASSIGNOR TO THE TESLA ELECTRIC COMPANY, OF SAME PLACE.

ELECTRO-MAGNETIC MOTOR.

SPECIFICATION forming part of Letters Patent No. 424,036, dated March 25, 1890.

Application filed May 20, 1889. Serial No. 311,416. (No model.)

*To all whom it may concern:*

Be it known that I, NIKOLA TESLA, a subject of the Emperor of Austria-Hungary, from Smiljan, Lika, border country of Austria-Hungary, residing at New York, in the county and State of New York, have invented certain new and useful Improvements in Electro-Magnetic Motors, of which the following is a specification, reference being had to the drawings accompanying and forming a part of the same.

I have invented and elsewhere described an electro-magnetic motor operated or adapted to be operated by an alternating electric current, and which is now commonly designated, whether correctly or not, a "magnetic-lag" motor. The main distinguishing features of this motor are the following: An armature is mounted within the magnetizing influence of a certain number of field magnets or poles of different magnetic susceptibility—that is to say, poles of unequal length, mass, or composition—and wound with coils adapted in the operation of the motor to be connected to a source of alternating currents. When an alternating current is passed through the coils of such a motor, the field magnets or poles do not appear to manifest their attractive effect upon the armature simultaneously, the magnetic attraction of some appearing to lag behind that of others, with the result of producing a torque and rotation of the motor. Generally I have made such motors with closed armature-coils.

I have invented another form of motor, which, for similar reasons, may be called a "magnetic-lag" motor; but in operation it differs from that which I have above described in that the attractive effects or phases of the poles, while lagging behind the phases of current which produce them, are manifested simultaneously and not successively.

To carry out this invention I employ a motor embodying the principle of construction of a motor described and claimed in an application filed by me January 8, 1889, No. 295,745, to the extent that both the armature and field receive their magnetism from a single energizing-coil or a plurality of coils acting as one.

A motor which embodies my invention, with certain modifications thereof, is illustrated in the accompanying drawings.

Figure 1:
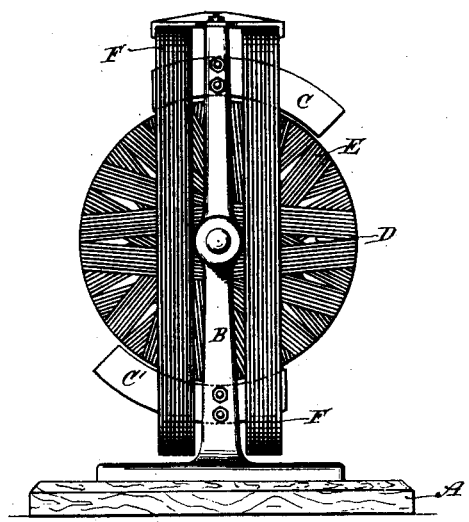
Figure 2:
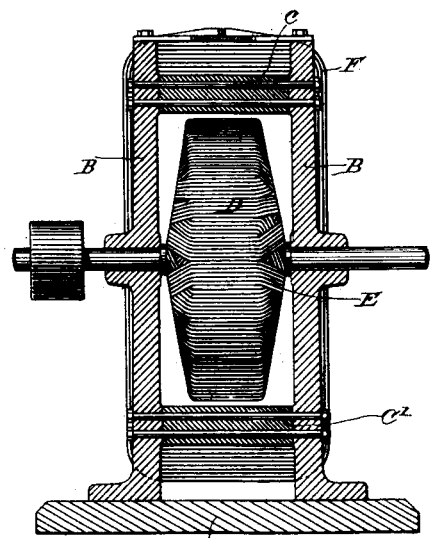
Figure 3:
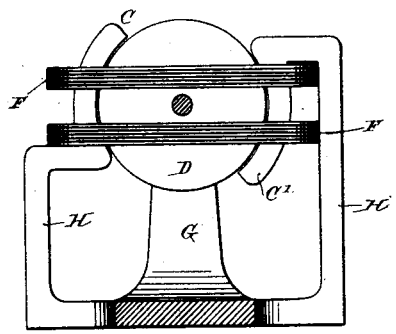
Figure 4:
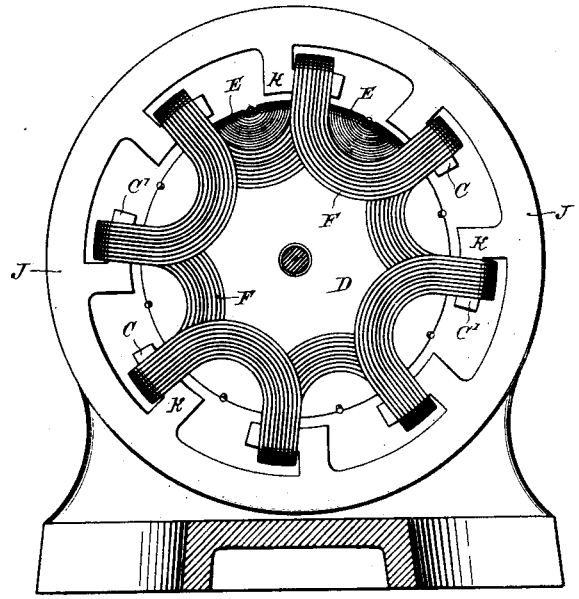

Figure 1 is a side view of the motor in elevation. Fig. 2 is a part-sectional view at right angles to Fig. 1. Fig. 3 is an end view in elevation and part section of a modification, and Fig. 4 is a similar view of another modification.

In Figs. 1 and 2, A designates a base or stand, and B B the supporting-frame of the motor. Bolted to the said supporting-frame are two magnetic cores or pole-pieces C C', of iron or soft steel. These may be subdivided or laminated, in which case hard iron or steel plates or bars should be used, or they should be wound with closed coils. D is a circular disk-armature built up of sections or plates of iron and mounted in the frame between the pole-pieces C C', which latter are preferably curved to conform to the circular shape thereof. I may wind this disk with a number of closed coils E. F F are the main energizing-coils, supported in any convenient manner by the supporting-frame, or otherwise, but so as to include within their magnetizing influence both the pole-pieces C C' and the armature D. The pole-pieces C C' project out beyond the coils F F on opposite sides, as indicated in the drawings. If an alternating current be passed through the coils F F, rotation of the armature will be produced, and this rotation I explain by the following apparent action or mode of operation: An impulse of current in the coils F F establishes two polarities in the motor. The protruding end of pole-piece C, for instance, will be of one sign, and the corresponding end of pole-piece C' will be of the opposite sign. The armature also exhibits two poles at right angles to the coils F F, like poles to those in the pole-pieces being on the same side of the coils. While the current is flowing there is no appreciable tendency to rotation developed; but after each current impulse ceases or begins to fall the magnetism in the armature and in the ends of the pole-pieces C C' lags or continues to manifest itself, which produces a rotation of the armature by the repellent force between the more closely approximating points of maximum magnetic effect. This effect is continued by the reversal of current, the polarities of field and armature being simply reversed. One or both of the elements—the armature or field—may be wound with closed induced coils to intensify this effect, although in the drawings I have shown but one of the fields, each element of the motor really constitutes a field, wound with the closed coils, the currents being induced mainly in those convolutions or coils which are parallel to the coils F F. A modified form of this motor is shown in Fig. 3. In this form G is one of two standards that support the bearings for the armature-shaft. H H are uprights or sides of a frame, preferably magnetic, the ends C C' of which are bent, substantially as shown, to conform to the shape of the armature D and form field-magnet poles. The construction of the armature may be the same as in the previous figure, or it may be simply a magnetic disk or cylinder, as shown, and a coil or coils F F are secured in position to surround both the armature and the poles C C'. The armature is detachable from its shaft, the latter being passed through the armature after it has been inserted in position. The operation of this form of motor is the same in principle as that previously described and needs no further explanation.

One of the most important features in alternating-current motors is that they should be adapted to and capable of running efficiently in the alternating systems in present use, in which almost without exception the generators yield a very high number of alternations. Such a motor I have designed by a development of the principle of the motor shown in Fig. 3, making a multipolar motor, which is illustrated in Fig. 4. In the construction of this motor I employ an annular magnetic frame J, with inwardly-extending ribs or projections K, the ends of which all bend or turn in one direction and are generally shaped to conform to the curved surface of the armature. Coils F F are wound from one part K to the one next adjacent, the ends or loops of each coil or group of wires being carried over toward the shaft, so as to form U-shaped groups of convolutions at each end of the armature. The pole-pieces C C', being substantially concentric with the armature, form ledges, along which the coils are laid and should project to some extent beyond the coils, as shown. The cylindrical or drum armature D is of the same construction as in the other motors described, and is mounted to rotate within the annular frame J and between the U-shaped ends or bends of the coils F. The coils F are connected in multiple or in series with a source of alternating currents, and are so wound that with a current or current impulse of given direction they will make the alternate pole-pieces C of one polarity and the other pole-pieces C' of the opposite polarity. The principle of the operation of this motor is the same as the other herein described, for, considering any two pole-pieces C C', a current impulse passing in the coil which bridges them or is wound over both tends to establish polarities in their ends of opposite sign and to set up in the armature-core between them a polarity of the same sign as that of the nearest pole-piece C. Upon the fall or cessation of the current impulse that established these polarities the magnetism which lags behind the current phase, and which continues to manifest itself in the polar projections C C' and the armature, produces by repulsion a rotation of the armature. The effect is continued by each reversal of the current. What occurs in the case of one pair of pole-pieces occurs simultaneously in all, so that the tendency to rotation of the armature is measured by the sum of all the forces exerted by the pole-pieces, as above described. In this motor also the magnetic lag or effect is intensified by winding one or both cores with closed induced coils. The armature-core is shown as thus wound. When closed coils are used, the cores should be laminated.

It is evident that a pulsatory as well as an alternating current might be used to drive or operate the motors herein described; but I prefer to use alternating currents.

It will be understood that the degree of subdivision, the mass of the iron in the cores, their size, and the number of alternations in the current employed to run the motor must be taken into consideration in order to properly construct this motor. In other words, in all such motors the proper relations between the number of alternations and the mass, size, or quality of the iron must be preserved in order to secure the best results. These are matters, however, that are well understood by those skilled in the art.

What I claim is—

1. In an alternating-current motor, the combination, with the armature and field-cores, of stationary energizing-coils enveloping the said cores and adapted to produce polarities or poles in both, the field-cores extending out from the coils and constructed so as to exhibit the magnetic effect imparted to them after the fall or cessation of current impulse producing such effect, as set forth.

2. In an alternating-current motor, the combination, with an armature-core circular in configuration, of a supporting-frame, field-cores extending therefrom over portions of the periphery of the armature, and energizing-coils surrounding said armature and parts of the field-cores, as set forth.

3. The combination, with the rotatably-mounted armature, of the circular frame J, the ribs K, with polar extensions extending over portions of the armature, and the energizing-coils F, wound over portions of the pole-pieces and carried in loops over the ends of the armature, as herein set forth.

NIKOLA TESLA.

Witnesses:
R. J. STONEY, Jr.,
E. P. COFFIN.